United States Patent [19]

McLaughlin et al.

[11] 4,137,972
[45] Feb. 6, 1979

[54] ACIDIZING RESERVOIRS WHILE CHELATING IRON WITH SULFOSALICYLIC ACID

[75] Inventors: William A. McLaughlin; David C. Berkshire, both of Houston, Tex.

[73] Assignee: Shell Oil Company, Houston, Tex.

[21] Appl. No.: 809,586

[22] Filed: Jun. 24, 1977

[51] Int. Cl.$^2$ .............................................. E21B 43/16
[52] U.S. Cl. .............................. 166/307; 252/8.55 B; 252/8.55 C; 166/308
[58] Field of Search ...................... 252/8.55 C, 8.55 B; 166/307, 304, 308; 424/DIG. 6

[56] References Cited

U.S. PATENT DOCUMENTS

| | | | |
|---|---|---|---|
| 2,885,004 | 5/1959 | Perry | 252/8.55 C |
| 3,142,335 | 7/1964 | Dill et al. | 252/8.55 C |
| 3,625,284 | 12/1971 | Gogarty et al. | 166/307 X |
| 3,799,266 | 3/1974 | Kiel | 252/8.55 C X |
| 3,914,132 | 10/1975 | Sutton | 252/8.55 B |
| 3,970,148 | 7/1976 | Jones et al. | 252/8.55 C X |
| 4,096,914 | 6/1978 | McLaughlin et al. | 252/8.55 C X |

OTHER PUBLICATIONS

*Chemistry of the Metal Chelate Compounds*; Martell and Calvin; Aug. 1952; pp. 99 and 100 (4th paragraph p. 99 thru 2nd paragraph p. 100) and p. 543.

*Primary Examiner*—Benjamin R. Padgett
*Assistant Examiner*—J. L. Barr

[57] ABSTRACT

The acidizing of a reservoir, particularly one that contains an asphaltenic oil, is improved by using an aqueous solution of strong acid which contains enough sulfosalicylic acid to prevent the formation of iron-asphaltenic solids.

15 Claims, 2 Drawing Figures

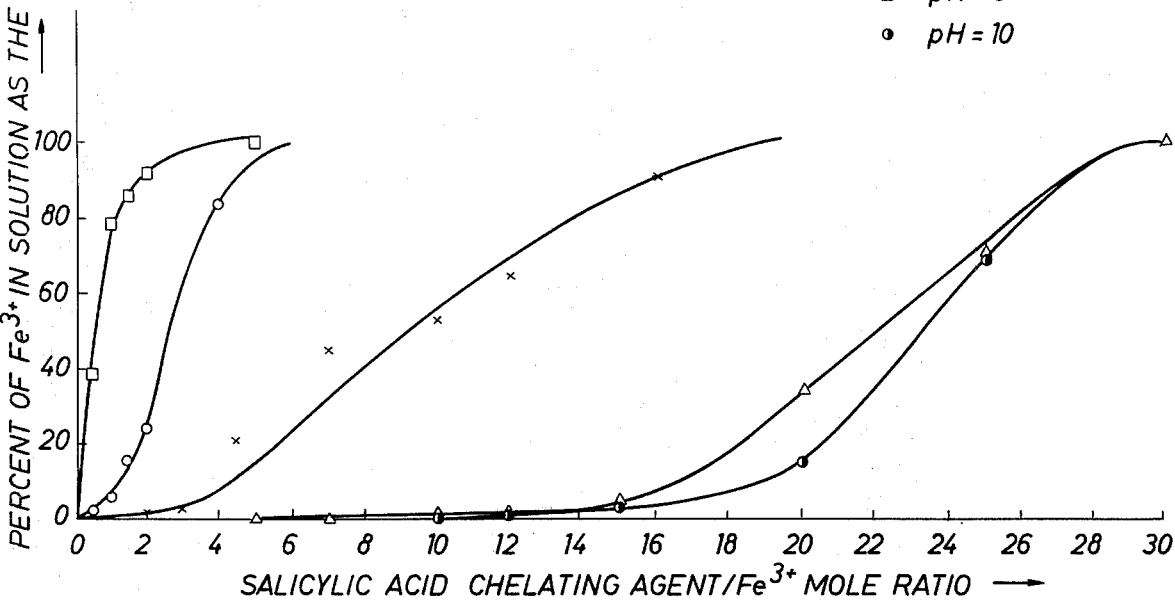

ACIDIZING RESERVOIRS WHILE CHELATING IRON WITH SULFOSALICYLIC ACID

BACKGROUND OF THE INVENTION

The invention relates to acidizing an oil reservoir. It is particularly pertinent to treating an asphaltenic reservoir with an aqueous solution of a strong acid, such as hydrochloric acid or mud acid, that comes into contact with iron containers or conduits before it contacts the reservoir.

It is known that aqueous solutions of strong acid dissolve significant proportions of ferric and ferrous iron from iron containers or conduits or components of subterranean reservoir formations. For example, a paper of Journal of Petroleum Technology, September 1969, pages 1121 to 1129, indicates that the dissolved iron content in spent acids from wells treated in West Tesas were significantly high and in some cases about 2.6 percent. It states that "Sequestering agents have been used for many years to prevent the reprecipitation of an iron from spent acid solutions. Those most commonly used include citric acid, acetic acid, mixtures of citric and acetic acids, lactic acid, gluconic acid, ethylenediaminetetraacetic acid (EDTA), and nitrilotriacetic acid (NTA)." And, "The EDTA, NTA, and citrate complexes of iron are much more stable than the acetate."

Patent application (now U.S. Pat. No. 4,096,914) Ser. No. 748,087, filed Dec. 6, 1976, by W. A. McLaughlin and E. A. Richardson (the 087 application) indicates that, in addition to being capable of forming permeability impairing hydrated iron oxides, ferric ions in an oil reservoir acidizing fluid are also capable of forming permeability impairing iron-asphaltene solids, particularly in reservoirs containing more than about 1/2% by weight of asphaltenic components. The solids formed by the interaction between ferric ions and asphaltenes are particularly insoluble. Although none of the prior art published before the Ser. No. 748,087 application was filed mentioned problems due to solids formed by the interaction of iron and asphaltenes, the difficulties of removing any organic desposits containing asphaltenic materials were known. For example, the need for using solvents containing both an aromatic hydrocarbon and an amine in order to dissolve asphaltene-containing deposits was described in application B-359,946, published Jan. 28, 1975 (now U.S. Pat. No. 3,914,132).

As indicated in the Ser. No. 748,087 application, the forming and precipitating of iron-asphaltene solids due to the interaction of ferric ion-containing aqueous acid and a crude oil is not readily apparent, due to the relatively slow precipitate development and emulsion-forming tendencies of such a system. However, based on numerous tests of numerous types of reducing agents and iron chelating materials, it was discovered that the incorporation of salicylic acid within a ferric ion-containing aqueous solution of a strong acid was uniquely effective in preventing the formation of permeability impairing iron-asphaltene solids. The disclosure of the Ser. No. 748,087 application is incorporated herein by cross-reference.

Numerous patents relate to using chelating agents for avoiding the deleterious effects of dissolved iron in well treatments involving aqueous strong acids. For example, in U.S. Pat. No. 2,175,081, which was applied for in 1937, it is suggested that since most of such deleterious effects are due to the precipitation of ferric ions, and such effects can be avoided by incorporating a water-soluble reducing agent within the injected acid. U.S. Pat. No. 2,175,095 suggests the inclusion within an acidizing fluid of a material such as lactic acid, ammonium acetate, glycine, glycolic acid, citric acid, or the like, which is capable of preventing the precipitation of iron or aluminum hydrates at their normal precipitation pH values. U.S. Pat. No. 2,335,689 suggests a similar inclusion of an iron sequestering agent, such as a polyhydric phenol within the injected acids. U.S. Pat. No. 3,142,335 suggests such a use of a sequestering agent containing a mixture of ingredients that function as a buffering agent, such as citric acid or citrate salt mixed with acetic or formic acids or their salts. U.S. Pat. No. 3,150,081 suggests a similar incorporation of mixtures of hydroxyacetic and citric acids, which mixtures are said to be cheaper and more effective than such a use of either of those acids by itself.

SUMMARY OF THE INVENTION

The present invention relates to improving a process for acidizing a subterranean reservoir which contains an asphaltenic crude by injecting an aqueous strong acid solution into the reservoir. The improvement comprises dissolving enough 5-sulfosalicylic acid in the acid solution to chelate with ferric ions and avoid the formation of permeability impairing deposits of iron-asphaltenic solids.

DESCRIPTION OF THE DRAWING

FIGS. 1 and 2 are illustrations of graphs of variations in the percentages of dissolved ferric iron which become chelated with increases in the mole ratios of chelating agent to ferric ions.

DESCRIPTION OF THE INVENTION

The present invention is, at least in part, premised on the following discovery. With respect to chelating the ferric ions that becomes dissolved in a strong acid solution, to keep those ions from forming iron-asphaltenic solids, 5-sulfosalicylic acid has been found to be more beneficial than salicylic acid, for the following reasons. The 5-sulfosalicylic acid (a) chelates with more ferric ions at a lower mole ratio of chelating agent to ferric ions at pH's of less than about 3, (b) has a much greater water-solubility at the lower pH's, and (c) forms calcium salts which are significantly water-soluble and are capable of avoiding any deleterious precipitation of calcium sulfosalicylates.

In general, the aqueous strong acid used in the present invention can be substantially any which is capable of dissolving solid materials encountered within a subterranean asphaltenic oil reservoir. Such acids generally comprise solutions and/or homogeneous dispersions or emulsions of an aqueous hydrochloric acid, or a mixture of hydrochloric acid with hydroflouric acid and/or thickeners, corrosion inhibitors, wetting agents, or the like. The hydrochloric acid content of such solutions can range from about 1 to about 30% by weight. Particularly suitable acids for use in the present invention comprise aqueous hydrochloric acids containing from about 5 to 15% hydrochloric acid, and aqueous mud acids containing from about 5 to 15% hydrochloric acid mixed with from about 1 to 3% hydrofluoric acid.

In accordance with the present invention, enough 5-sulfosalicylic acid is dissolved in such a strong acid solution to prevent the formation of significant amounts of iron-asphaltenic solids by chelating with substantially all of the ferric ions which are, or are apt to become, dissolved in the strong acid solution before or during its contacting of the reservoir to be acidized. As will be apparent to those skilled in the art, the sulfosalicylic acid can be, if desired, dissolved in the aqueous strong acid solution by mixing the solution with a salt of the sulfosalicylic acid.

In acidizing a reservoir in accordance with the present invention, the aqueous strong acid solution that contains sulfosalicylic acid may be injected before, during or after the injection of other formation treating materials. For example, such solutions may be emulsified with or injected ahead of or behind a liquid oil solvent, e.g., a liquid hydrocarbon. Where an oil solid is used, it is preferably a solvent for asphaltenic oils, such as a normally liquid aromatic hydrocarbon having an asphaltenic oil solubility at lest substantially equivalent to that of toluene. The aqueous strong acid solution containing the sulfosalicylic acid may also be injected along with or ahead of or behind a relatively viscous aqueous solution containing a water-thickening agent. Suitable thickening agents include biopolymers, e.g., Kelzan or Xanblood Xanthan gum biopolymers (available from Kelco Company); Polytran nonionic biopolymers (available from Pillsbury Company); partially hydrolized polyacrylamides, e.g., Pusher (available from Dow Chemical Company); or the like.

Numerous tests, of the type described in the Ser. No. 748,087 application, have been made of the tendency for iron-asphaltenic solids to be formed when iron-containing solutions of strong acids are contacted with an asphaltenic crude oil, or a synthetic crude oil, such as a solution of a Ventura crude in toluene, and the capability of various additives for preventing the formation of such solids. Such tests indicate that none of the chelating agents commonly used in acidizing treatments, e.g., citric acid, lactic acid, acetic acid nd EDTA, form ferric iron chelant complexes of sufficient stability to prevent the formation of iron asphaltene solids.

In addition, as known to those skilled in the art (e.g., as indicated in the above mentioned journal article), each of the chelating agents commonly used in acidizing solutions is limited in its ability to prevent ferric hydroxide precipitation as the acid solution becomes spent. For example, citric acid, which is an excellent chelating agent at pH values between about 2 and 6, must be used with caution since the solubility of its calcium salt is less than about 1% (0.018 molar), at 25° C. Lactic and acetic acid are capable of forming ferric iron-chelant compounds of significant strengths only at pH's of up to about 4, for lactic acid, and up to about 2 for acetic acid. Although ethylenediaminetetraacetic acid is capable of forming highly stable complexes with iron at pH's above about 3, it is, itself, only sparingly soluble at any lower pH.

We have found that both salicylic acid and 5-sulfosalicylic acid have such strong tendencies to chelate with ferric ions that they are capable of (1) preventing for formation of iron-asphaltenic solids, (2) abstracting iron from preformed iron-asphaltene solids, and (3) preventing the precipitation of ferric hydroxide (or hydrated ferric oxides) over a wide range of pH.

Both salicylic acid and 5-sulfosalicylic acid combine with ferric ions in stoichiometric quantities to form colored ligands. Since such solutions tend to conform to Beer's law, they can be analyzed spetrophotometrically for iron content. Such procedures were used to examine the iron chelation behavior of both salicylic acid and 5-sulfosalicylic acid. In the tested solutions, the pH was controlled at a selected value and the amount of chelating agent was varied. The percentage of the available iron that was complexed by the chelating agent was measured as a function of the concentration of the chelating agent.

FIG. 1 shows a plot of the relative molar quantities of salicylic acid which were required to complex substantially all of the ferric ions in solutions containing 0.002 moles per liter of ferric ions and having various pH's. FIG. 2 shows a similar plot of the quantities required where 5-sulfosalicylic acid was used. Because of the relatively large variations in quantities of chelating agent acid and base which were required to carry out such experiments over the indicated pH ranges, the total ionic strengths of the solutions varied significantly. Such variations caused some scatter in the data, particularly in the solutions in which the pH was relatively high. No buffers were used in the experimental procedures. In each case, the pH was adjusted with hydrochloric acid, or ammonium hydroxide, with the total ferric iron concentration being adjusted to the extent required to maintain 0.002 moles per liter.

A comparison of FIGS. 1 and 2 indicates the superiority of the 5-sulfosalicylic acid as a ferric iron-chelating agent, particularly in the mid to high range of pH. In addition, the sulfosalicylic acid is quite soluble over the entire range of pH; whereas the solubility of salicylic acid in acid solutions is only about 2% by weight, although ammonium salicylate is readily soluble at pH values of greater than about 3.

The calcium salts of 5-sulfosalicylic acid appear to present no solubility problems. At 25° C. we have prepared 0.3 moler (7.75% by weight) solution of the calcium salts, at a pH near 7, and observed that the solubility increases significantly with both temperature and decreasing pH. In comparison, the solubility of the calcium salt of salicylic acid is lower, about 2.3% at 15° C., and 35.7% at 100° C.

In general, in a well treatment process most, if not all, of the ferric ions that becomes dissolved in an aqueous acid that is injected into a reservoir formation will be derived from contaminants in the acid as delivered at the well site, or will be dissolved from rust and/or scale in the containers or conduits utilized in flowing the acid into the reservoir. Therefore, if the acid, as delivered at the well site, and the reservoir to be acidized is substantially free of ferric ions, most, if not all, of the sulfosalicylic acid which is used in the present process need only be incorporated within an initial volume of the acid. Such an initial volume should be large enough to remove substantially all of the rust from the iron containers through which the acid is flowed. Although the succeeding portions of acids will dissolve iron from the rust-free conduits, substantially all of that iron will be in the ferrous state.

In a particularly suitable procedure for conducting the present process, a volume of liquid solvent for asphaltenic oil (e.g., toluene) sufficient to dissolve most of the oil within the first few feet around the well is injected along with the salicylic acid-containing acidizing acid in the form of an oil-in-water emulsion. Alternatively, such a volume of such a solvent can be injected in the form of a slug preceding the injection of the acid.

Where the reservoir being treated by the present process is relatively unconsolidated, the procedure for injecting an oil solvent and the acidizing acid and returning the well to injection or production can advantageously be the slow injection and return procedure described in the J. H. Lybarger U.S. Pat. No. 3,948,324. Where the reservoir is siliceous and its permeability may be impaired by clay or silica fines, at least a portion of the acidizing acid should be a mud acid, and the materials injected should include pretreatment slugs of hydrochloric acid and ammonium chloride to enhance the clay-dissolving action of the mud acid. Where the reservoir is relatively free of clay or siliceous permeability-impairing materials, the acidizing acid can be free of hydrogen fluoride (which will eliminate the need for such HCl and NH$_4$Cl pretreatments) but the relatively slow injection of fluids and slow return to the injection or production rate best suited for the particular well can advantageously be those described in that patent.

In including the sulfosalicylic acid in a formation treating aqueous acid in accordance with the present process, various forms of starting materials and various procedures can be used to form a suitable solution and/or homogeneous dispersion. Sulfosalicylic acid and/or at least one alkali metal or ammonium sulfosalicylic in the form of a solid or solution (preferably aqueous) can be simply mingled with the formation treating acid and agitated to an extent sufficent to provide a solution and/or homogeneous dispersion. Alternatively, such a form of the acid or salt can be premixed with the formation treating acid along with a solubilizing agent, e.g., a completely water miscible monohydric or polyhydric alcohol. Alternatively, such an acid or salt can be mixed with the formation treating acid along with an oil solvent liquid and agitated to provide an oil and water emulsion or dispersion. Alternatively, such a solution or dispersion of sulfosalicylic acid or its salts can be injected into the reservoir immediately ahead of the formation treating acid (which may or may not be mixed with solubilizing agents or oil solvents) so that the formation treating acid is mixed with the sulfosalicylic acid within the reservoir formation.

Particularly advantageous procedures comprise (a) premixing the reservoir formation treating acid (and/or a mixture of it and an oil solvent) with the solid sulfosalicylic acid or an aqueous solution of its salt or (b) where the well or subterranean earth formation to be treated may contain aqueous solutions of ferric iron within the zone to be treated, injecting a slug of an aqueous solution of the acid or its salt before injecting the sulfosalicylic acid-containing portion of the formation treating acid.

In general, the concentration of sulfosalicylic acid within the first injected portion of the formation treating acid should be from about 0.2 to 1.0 moles per liter. The concentration of sulfosalicylate ions in an aqueous sulfosalicylate-containing pretreatment solution should be from about 0.01 to 1.0 moles per liter. Where the aqueous formation treating acid is being mixed with a solution of sulfosalicylic acid (or at least one of its salts) the salicylate-containing solution is preferably relatively concentrated, e.g., a substantially saturated solution of the acid in a hot aqueous solution or a substantially saturated aqueous solution of a salt of the acid.

What is claimed is:

1. In a well treating process in which an aqueous solution of a strong acid which contains from about 1 to 30% by weight of hydrochloric acid and is capable of dissolving solids in a manner increasing the permeability of a subterranean earth formation is contacted by ferric or ferrous iron compounds or metal within iron containers or conduits and is injected into a subterranean reservoir that contains an asphaltenic oil which tends to produce permeability impairing iron-asphaltene solids within the reservoir, the improvement which comprises, including within at least the first injected portion of the aqueous acid, a solution or homogeneous dispersion of at least enough 5-sulfosalicylic acid to chelate with and thereby prevent the formation of iron-asphaltene solids by substantially all of the ferric ions that become dissolved within the strong acid solution that enters the earth formation.

2. The process of claim 1 in which sulfosalicylic acid-containing portion of the strong acid solution is mixed with a liquid solvent for an asphaltenic oil.

3. The process of claim 2 in which the oil solvent comprises an aromatic liquid hydrocarbon which is dispersed within the aqueous acid as an oil phase of an oil-in-water emulsion.

4. The process of claim 1 in which the sulfosalicylic acid-containing strong acid solution is flowed into the subterranean earth formation during the course of a fracture-acidizing treatment of the well.

5. The process of claim 1 in which the flowing of sulfosalicylic acid-containing strong acid solution into the subterranean earth formation is preceded by flowing a slug of liquid solvent for an asphaltenic oil into that formation.

6. The process of claim 1 in which the strong acid solution is a mud acid and the flowing of the sulfosalicylic acid-containing portion of the mud acid into the reservoir is preceded by the flowing into the reservoir of a sulfosalicylic acid-containing portion of aqueous hydrochloric acid.

7. The process of claim 1 in which the sulfosalicylic acid is included in the first injected portion of the strong acid solution by mixing it with that portion in the form of a substantially dry solid or relatively concentrated aqueous solution of its ammonium salt.

8. The process of claim 7 in which the ammonium sulfosalicylate is mixed with the aqueous acid along with a liquid oil solvent and the mixture is agitated to form a relatively homogenous oil-in-water dispersion of oil solvent within the aqueous acid.

9. The process of claim 1 in which the injecting of the sulfosalicylic acid-containing portion of strong acid solution is preceded by injecting a slug of an aqueous solution of such ammonium sulfosalicylate.

10. The process of claim 9 in which the injection of the ammonium sulfosalicylate solution is preceded by injecting a slug of liquid oil solvent.

11. In a well treating process in which an aqueous solution of a strong acid capable of dissolving solids in a manner increasing the permeability of a subterranean earth formation is injected into a subterranean reservoir, the improvement which comprises, including within at least the first injected portion of the aqueous acid, a solution or homogeneous dispersion of at least enough 5-sulfosalicylic acid to chelate with substantially all of the ferric ions that become dissolved within the strong acid solution that enters the earth formation.

12. The process of claim 11 in which sulfosalicylic acid-containing portion of the strong acid solution is mixed with a liquid solvent for an asphaltenic oil.

13. The process of claim 12 in which the oil solvent comprises an aromatic liquid hydrocarbon which is disersed within the aqueous acid as an oil phase of an oil-in-water emulsion.

14. The process of claim 11 in which the sulfosalicylic acid-containing strong acid solution is flowed into the subterranean earth formation during the course of a fracture-acidizing treatment of the well.

15. The process of claim 11 in which the flowing of sulfosalicylic acid-containing strong acid solution into the subterranean earth formation is preceded by flowing a slug of liquid solvent for an asphaltenic oil into that formation.

* * * * *